(12) United States Patent
Hines

(10) Patent No.: US 8,045,691 B2
(45) Date of Patent: *Oct. 25, 2011

(54) METHOD AND APPARATUS FOR PROCESSING ROUTING REQUESTS

(75) Inventor: Patrick Hines, Ponte Vedra, FL (US)

(73) Assignee: Telecomcia Properties Limited (VG)

( * ) Notice: Subject to any disclaimer, the term of this patent is extended or adjusted under 35 U.S.C. 154(b) by 0 days.

This patent is subject to a terminal disclaimer.

(21) Appl. No.: 11/770,610

(22) Filed: Jun. 28, 2007

(65) Prior Publication Data

US 2008/0013711 A1    Jan. 17, 2008

Related U.S. Application Data

(63) Continuation of application No. 10/956,730, filed on Oct. 1, 2004, now Pat. No. 7,245,712.

(51) Int. Cl.
*H04M 3/42* (2006.01)

(52) U.S. Cl. .............................. 379/213.01; 379/210.01

(58) Field of Classification Search ............ 379/201.01, 379/201.02, 210.01, 213.01
See application file for complete search history.

(56) References Cited

U.S. PATENT DOCUMENTS

| 6,104,786 A * | 8/2000 | Gibilisco et al. ........... 379/88.23 |
| 7,245,712 B2 * | 7/2007 | Hines ....................... 379/213.01 |
| 2003/0231754 A1 | 12/2003 | Stein et al. |
| 2004/0008834 A1 * | 1/2004 | Bookstaff ................ 379/218.01 |

FOREIGN PATENT DOCUMENTS

| GB | 1168791 A | 1/2002 |
| WO | 9911049 A | 3/1999 |
| WO | 9941895 A | 8/1999 |

* cited by examiner

*Primary Examiner* — Harry S Hong
(74) *Attorney, Agent, or Firm* — DLA Piper LLP (US)

(57) ABSTRACT

The invention provides a method and apparatus for communication and provision of routing address information. The prior owner of a called telephone number is referred to herein as a "prior subscriber". When a number is released by a prior subscriber, it is placed into a database referred to as the "spare pool" which includes available (unsubscribed) telephone numbers. When a caller dials a number that is in the spare pool, the invention intercepts the call and takes any number of possible actions. In one embodiment, the invention automatically forwards the caller to a new number based on a database that stores the new number of the prior subscriber or routes the caller to a message that gives the caller the option (either via a charge or after listening to an advertisement) of being connected to, or being given, the current number of the prior subscriber.

22 Claims, 8 Drawing Sheets

METHOD AND APPARATUS FOR PROCESSING ROUTING REQUESTS

This is a continuation of application Ser. No. 10/956,730 filed Oct. 1, 2004 not U.S. Pat. No. 7,245,712.

BACKGROUND OF THE INVENTION

1. Field of the Invention

The present invention relates to the field of communication.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

Electronic communication, whether via land line, telephone, mail, internet, email, cell phone, etc, is accomplished by having a routing address of an intended receiver. In the world of telephony, this is the telephone number or subscriber line of the entity being called. In the context of the internet, it is the URL of a website. For email, it is the email address of the intended receiver. In today's fluid society, such routing addresses change constantly, often outpacing the ability of directories to keep up. In addition, a user may not keep up their own personal directory, leading to incorrect routing addresses for many entities. These problems are described below with respect to telephony, but have equal application to electronic communication such as email, web browsing, faxes, telexes, GPS location requests, etc.

In current telephony systems, a call placed to an inactive number may be handled in a number of ways. For example, if the former owner of the number has requested forwarding of the old number to a new number, the call may go through transparently to the caller, and reach the intended party. In other cases, the former owner of the number may have requested a forwarding message that indicates that the old number has been changed, with the new number then being provided. In both of these cases, the caller is able to connect with its intended party sooner or later.

More frustratingly are two other possibilities. In one, there is no forwarding message and the caller simply hears "This number is no longer in service" message. In another, the old number has already been assigned to a new customer, who knows nothing about the current number of the former owner. This of course can frustrate the caller and require additional research to identify a correct number to call.

The caller may decide to request directory assistance to locate the desired number. This may be difficult, if not impossible, when the former owner has changed cities or states. In many cases, directory assistance is limited to at least a region or city, and finding the number for an entity outside that region is not possible. The caller may also seek to use other resources, such as the Internet, published directories, etc. in an attempt to determine the appropriate phone number.

Sometimes the caller does not have the resources or time to spend looking up the information, particularly when traveling or when outside the office or home (such as on a cell phone). In other cases, the caller is not necessarily interested in a particular business or entity, rather in a service. For example, if the caller was seeking a florist who has changed its number to an unknown number and can't be found by directory assistance, the caller would like to get the name of another florist in the same neighborhood. Under current schemes, this requires the caller to already know the name of the alternative florist, or to spend time looking it up.

Another problem is the failure to get to a desired routing address due to errors in entry or routing of the address, due to mis-entry, electronic interference, computer error, etc. Currently there are no adequate techniques for catching such mistaken attempts and providing corrective and/or optional action.

SUMMARY OF THE INVENTION

The invention provides a method and apparatus for communication and provision of routing address information. When a communication is attempted to an inactive or a recently changed routing address, the present invention intercepts the attempt and provides one or more service options to the requester. These options may include providing or connecting the correct routing address to the requester, offering relevant services to the requester, subsequently contacting the requester and offering options, or directing the requester to other action or routing addresses that may provide desired solutions for the requester. In telephony, for example, the invention provides a method and apparatus to improve the ability of a caller to be connected to, or to easily learn a forwarding number of, a prior owner of a called telephone number. The prior owner of a called telephone number is referred to herein as a "prior subscriber". When a number is released by a prior subscriber, it is placed into a database referred to as the "spare pool" which includes available (unsubscribed) telephone numbers. When a caller dials a number that is in the spare pool, the invention intercepts the call and takes any number of possible actions. In one embodiment, the invention automatically forwards the caller to a new number based on a database that stores the new number of the prior subscriber or routes the caller to a message that gives the caller the option (either via a charge or after listening to an advertisement) of being connected to, or being given, the current number of the prior subscriber. In another scheme, the location of the caller is identified and the caller is offered the chance to learn the number of, or be connected to, a similar business in the geographic region. In another embodiment, the phone number of the caller is provided to a marketing service that calls back the caller within some predetermined time to offer a similar, competing, or even unrelated service as that of the prior subscriber.

In another embodiment of the invention, communication attempts are monitored and intercepted for analysis. The system detects faults in these attempts due to human error, computer error, and line/wireless interference. It then predicts and offers corrected connections, paths and solutions to complete the intended, desired or compatible transactions.

DETAILED DESCRIPTION OF THE INVENTION

The present invention relates to a method and apparatus for telephony. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

The invention provides a method of collecting and storing spare routing addresses. A novel database data structure provides the ability to provide a variety of options and services associated with the routing addresses. The invention also collects available information from a placed connection attempt to help) determine actions to implement based oh a variety of factors. A database of participating vendors is also maintained along with novel data structures so that one or more of a plurality of options may be implemented. An example of one embodiment of the invention is described below. In the description a routing address could be a phone number, URL, email address, or any other suitable routing address that allows communication between a sender and a receiver. One making a connection attempt may be referred to herein as a requester, caller, mailer etc. without departing from the scope of the invention.

Figure 1:
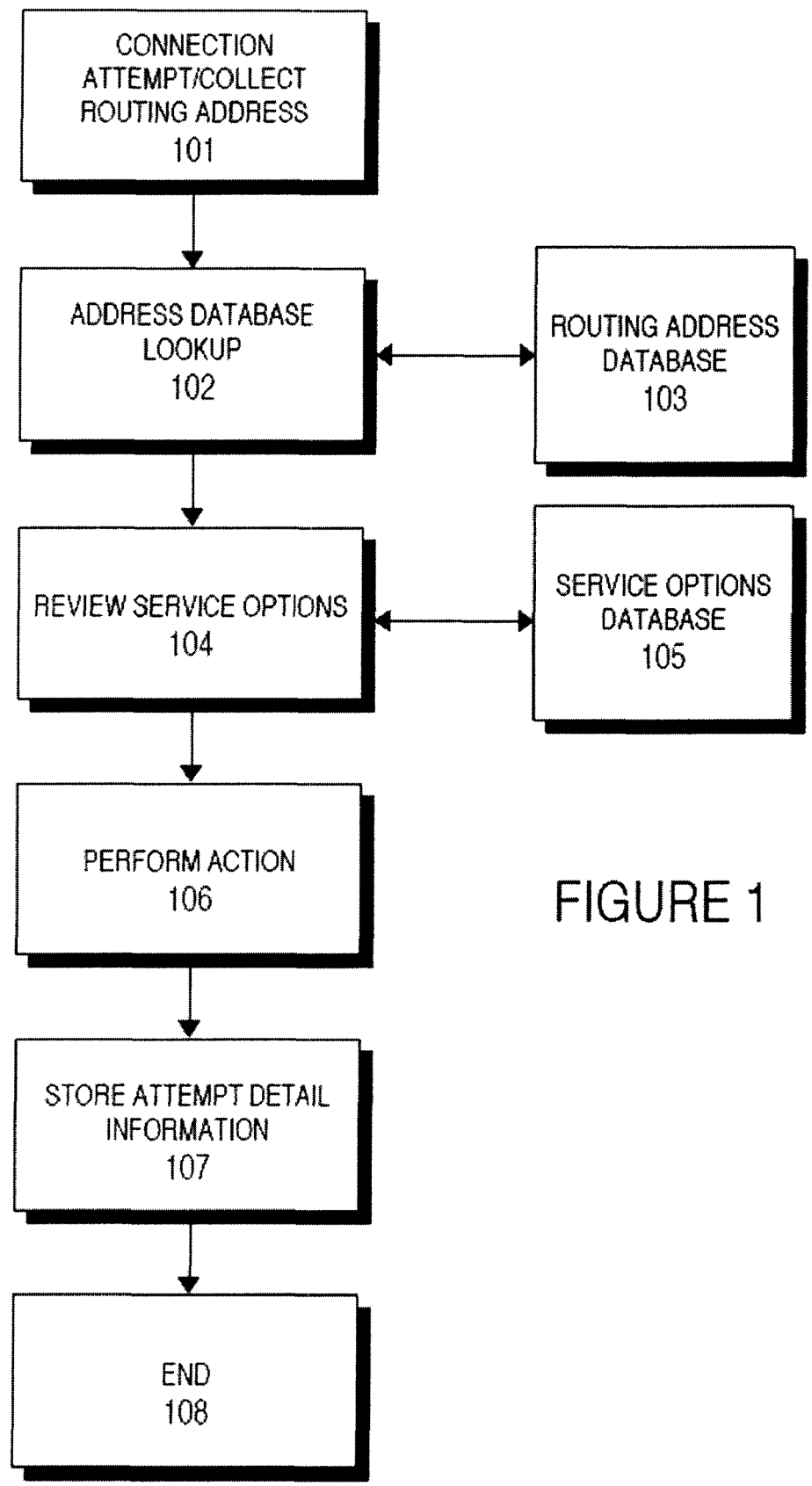
FIG. 1 is a flow diagram illustrating the operation of one embodiment of the present invention.

FIG. 1 is a flow diagram illustrating the operation of one embodiment of the present invention. At step 101 an incoming connection attempt is detected and the routing address is collected. In one embodiment of the invention, all connection attempts made to routing addresses that are handled by the invention are automatically routed to the system. In other embodiments, all communication attempts are monitored and sent through the system for analysis. At step 102 the captured routing address is provided to a connection address database 103 so that appropriate information can be determined. This information can include the name of the prior subscriber, any forwarding routing address for the prior subscriber, the type of business associated with the prior subscriber, the geographical region of the routing address, etc.

At step 104 the service options available for the routing address are determined, based in part on the information retrieved from database 103. In one embodiment this is accomplished by reviewing a service options database 105 that stores information about options for particular routing addresses or other indicia associated with the routing address (type of business, geography, etc.) The service options database also includes information regarding third party participants who may have agreed to participate in the system. Such third party participants are described in more detail below.

At step 106 the appropriate action on the call is performed based on the collected data. Such action may include automatically forwarding the requester to the prior subscriber, providing a message informing the requester that although the routing address is not working, the requester my be connected with a directory assistance service, may be connected for a fee, may be connected in return for accepting an advertisement, or may be offered to be connected to another local business providing the same or similar service.

At step 107 the detail of the connection attempt information is collected and stored in a database 109. The procedure ends at step 108.

Services

The present invention contemplates a number of services that can be provided to a caller who attempts to connect to a spare pool routing address (i.e. a routing address that has been relinquished by a prior subscriber). For example, a caller may receive a message indicating how the caller can access the new routing address of the prior subscriber. This may be a for-fee directory assistance service, a web site, etc. The caller is provided an access code and is charged for accessing the directory assistance. A web user who attempts to link to an abandoned or unassigned URL may be offered a gateway multiple products and services.

Another type of service can be provided by having a number of participating sponsors or vendors. For example, if the caller is attempting to contact a flower shop but that flower shop has changed numbers, moved or is out of business, the caller may be offered the chance to connect to another flower shop in the same or similar geographic region as either the prior subscriber, or in the region of the caller. The participating sponsor can then be charged each time a caller accepts the opportunity to be connected. Alternatively, the caller is charged a fee in return for the connection.

Another possible service is related to the ability to identify a caller who is available to receive calls because their presence in a communication medium is known. In telemarketing, a large number of attempted calls are not completed because the intended receivers are not at home at the time. In one embodiment, the present invention includes one or more participants who wish to be notified when a call attempt is made that goes through the system of the invention. Such activity indicates that the caller is at home or near a phone and is more likely to answer than when calling is random. In such a circumstance, the routing address of the caller is provided to a participant that matches some indicia associated with the caller (e.g. geographic region, type of business of attempted connection, time of day, etc.). The participant then calls the caller within some time frame with the expectation that the chances of answer are increased substantially.

This embodiment is described in connection with the invention used with telephony in FIG. 2 below. It should be noted that similar services could be offered in other communication mediums as well.

Figure 2:
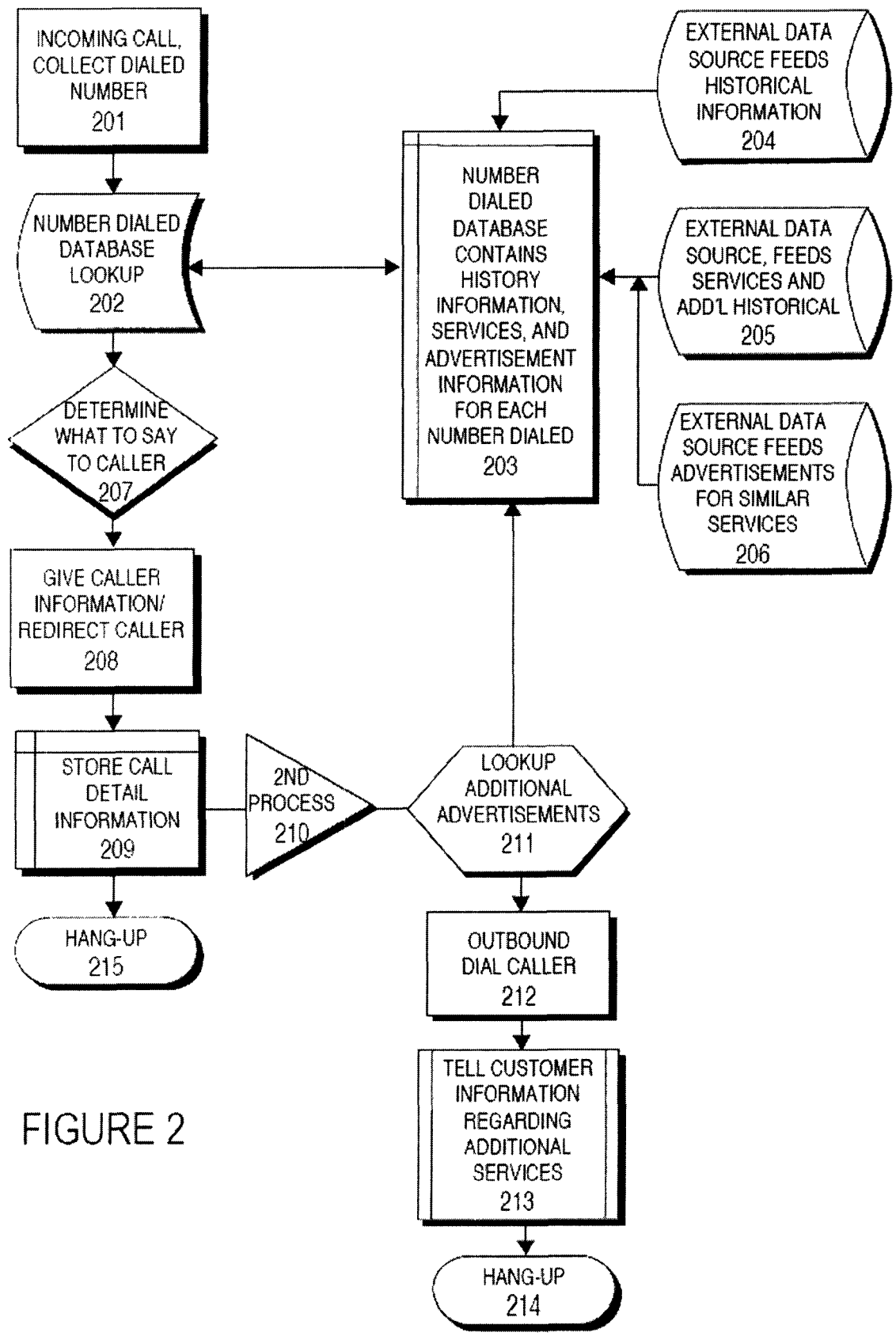
FIG. 2 is a flow diagram illustrating another embodiment of the present invention.

Referring to FIG. 2, an incoming call is placed and the dialed number is collected at step 201. At step 202 that number is fed to database 203 for analysis. Database 203 includes internal and external data. Sources of external data include source, feeds and historical information 204, services and historical 205, and advertisements 206.

At step 207 it is determined, based on database analysis, how to respond to the caller and a service option such as described previously is provided at step 208. At step 209 the call detail information is stored and information is added to the database and the call ends at step 215.

Optionally in this embodiment, the call information is taken through a second process 210 to lookup 211. At this step the database is again analyzed to determine if there is a participant or ad that may match what the caller may be interested in, based on caller phone number information or other indicators. An outbound dial caller is activated at step 212 and the ad or information is provided to the customer at step 213, with the second call ending at step 214. In one embodiment, the second process is held until receiving a signal that the original call transaction has ended at step 215.

Databases

Figure 3:
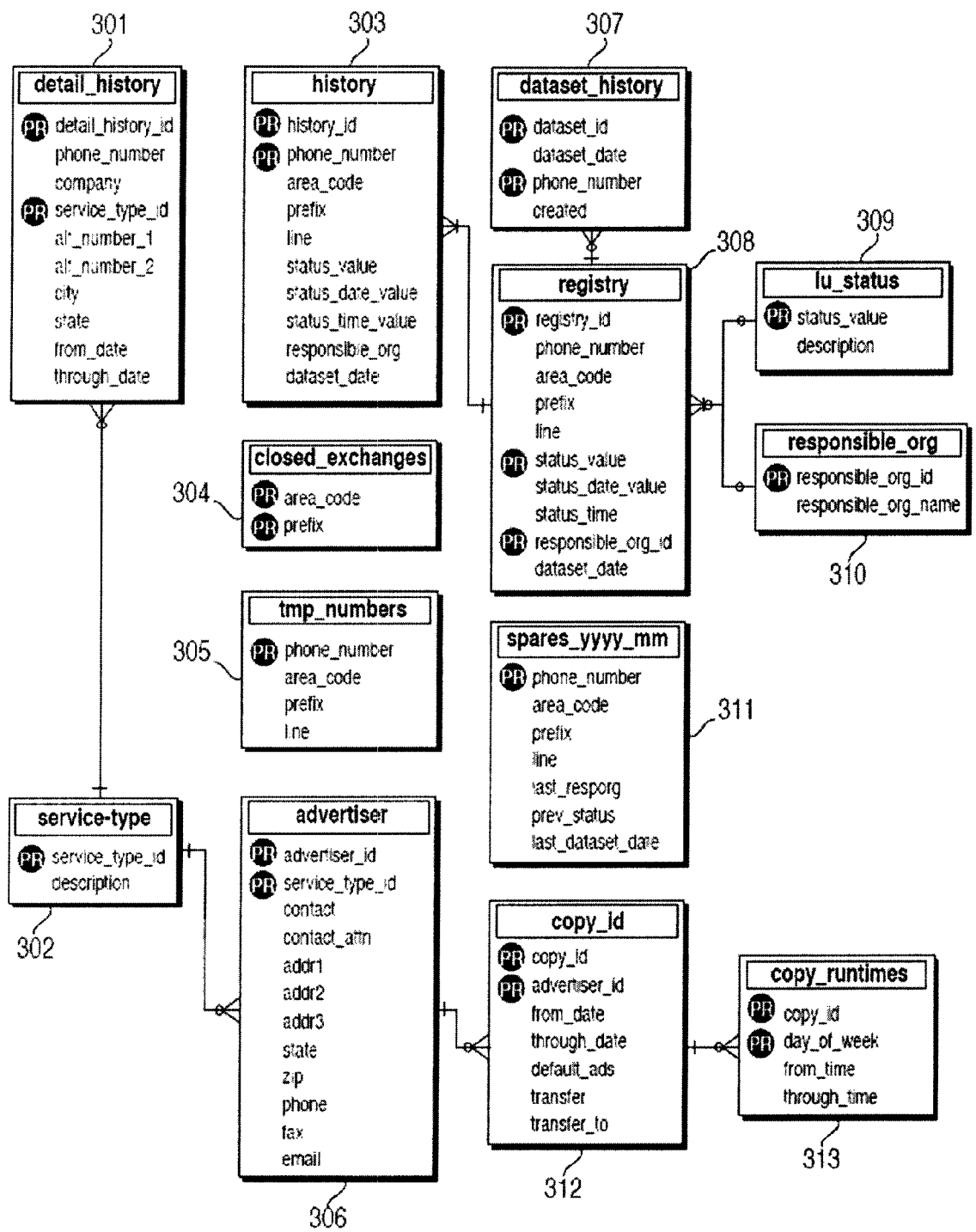
FIG. 3 is an example of an embodiment of a database in the present invention.

The invention maintains databases on spare pool routing addresses as well as connection transactions and on the numbers of callers making attempted connections. An example of an embodiment of a database of phone numbers is illustrated in FIG. 3. A number of tables are stored with data that is used in various embodiments of the invention and related to the various services that are provided.

Table 301 maintains transaction detail history including a history ID, the phone number dialed, the associated company (prior subscriber), the service type provided for the transaction, along with alternate number information and geographical information. The service type ID and description is found in Table 302 and is related to Tables 306, 312 and 313. Table 306 stores advertiser information including advertiser ID, service type ID associated with the advertiser, along with contact and geographical information. The advertiser may be the same or different than the prior subscriber, depending on the nature of the transaction. Table 312 is a database of copy or content associated with an advertisement or advertiser and includes a copy ID, advertiser ID, valid date range information, default ads and transfer information. A copy runtime table 313 stores information about copy IDs and trigger times associated with the content.

Tables 304 and 305 store closed exchanges and temporary numbers respectively. These tables are checked when a call comes in to determine if the system should handle the number or not. The closed exchanges stores area codes and prefixes that are not available for handling by the system of the invention. Table 311 stores the temporal history of spare pool numbers, storing all number related information along with identification of the last responsible organization, previous status, and last dataset date.

Table 308 is a registry table that stores information about the active numbers in the system, including all phone number related information (number, area code, prefix, line) along with status value information, statues date and time information, responsible organization ID and dataset date information. The history of each number is kept in a history table 303 that includes information about a number over time. Dataset History table 307 tracks the dataset temporal data including the creation date for a dataset for a new number or a new dataset for an existing number. Table 310 stores information about the responsible organization for a number (i.e. the Telco that is responsible for the number). Table 309 stores value descriptions for a number.

Acquiring Numbers

Figure 4:
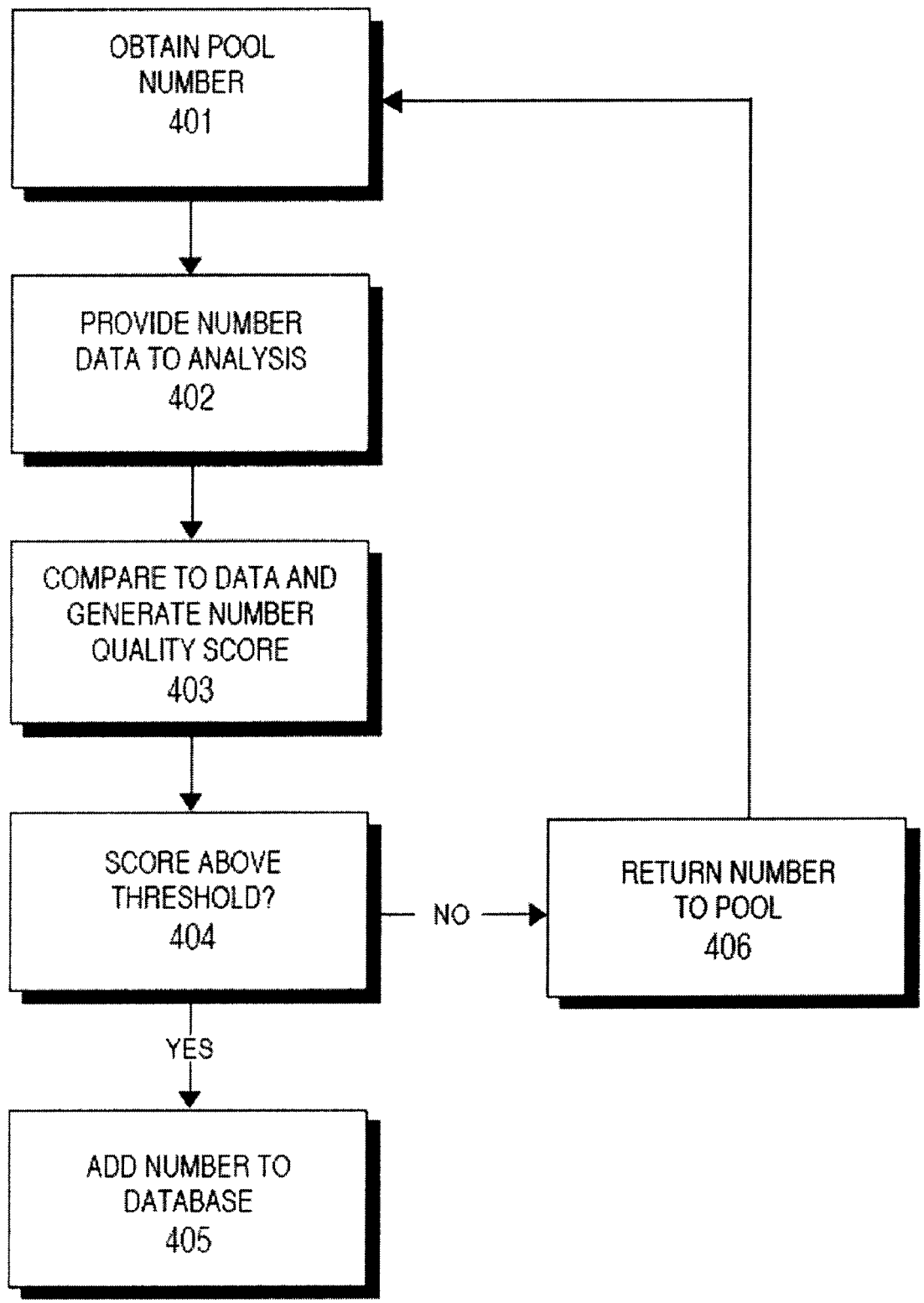
FIG. 4 is a flow diagram of one embodiment of number acquisition in the present invention.

There are a number of number administration resources that track active and spare pool numbers and permit automated and batch queries and updates of spare pool numbers. The present invention takes advantage of these systems (e.g. SMS/800 Centralized Management System) to reserve, activate, reroute, deactivate, and release spare pool numbers to the system of the invention. Some of the systems provide call history information and the present invention can be implemented to set certain parameters of call frequency, location, related business, etc. to determine if automatic acquisition is in order. A flow diagram illustrating number acquisition in one embodiment of the invention is shown in FIG. 4.

At step 401 a spare pool number is acquired from a number administration management system. The history of the number is provided to an analysis process at step 402. The process compares associated metadata of the phone number to predetermined values at block 403 and a number quality score is determined. At decision block 404 it is determined if the number quality score exceeds an acquisition threshold. If yes, the number is acquired and added to the database at step 405. If no, the number is returned to the pool at step 406 and the system returns to step 401.

Service Selection

Figure 5:
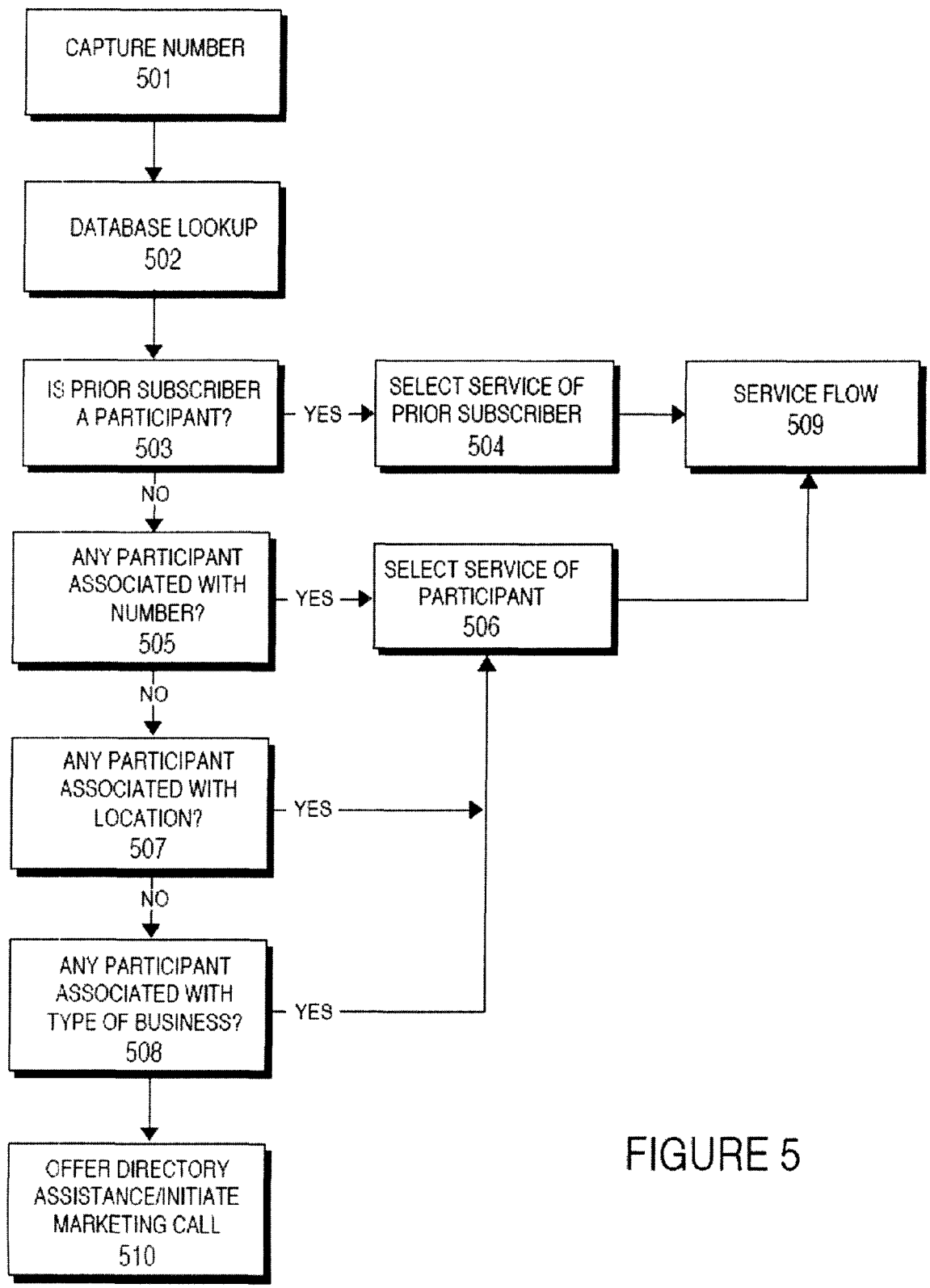
FIG. 5 is a flow diagram of service selection in one embodiment of the present invention.

FIG. 5 is a flow diagram of service selection in one embodiment of the present invention. At Step 501 the dialed number is captured and sent to the database lookup at step 502. At decision block 503 it is determined if the prior subscriber is a participant and has a service associated with the captured number. If yes, the system proceeds to step 504 and a service of the prior subscriber is selected and the system proceeds to service flow 509.

If the prior subscriber is not a participant, it is determined at decision block 505 if any participant is associated with the particular number. If yes, the service of the participant is selected at step 506 and the system proceeds to service flow 509. If there is no participant associated with the specific number it is determined at decision blocks 507 and 508 if there is a participant associated with geographic location and type of business respectively. If yes, the system proceeds to steps 506 and 509. If not, the system offers directory assistance at step 510, with a possible initiation of a follow up marketing call as described above in FIG. 2.

Service Flow

Figure 6:
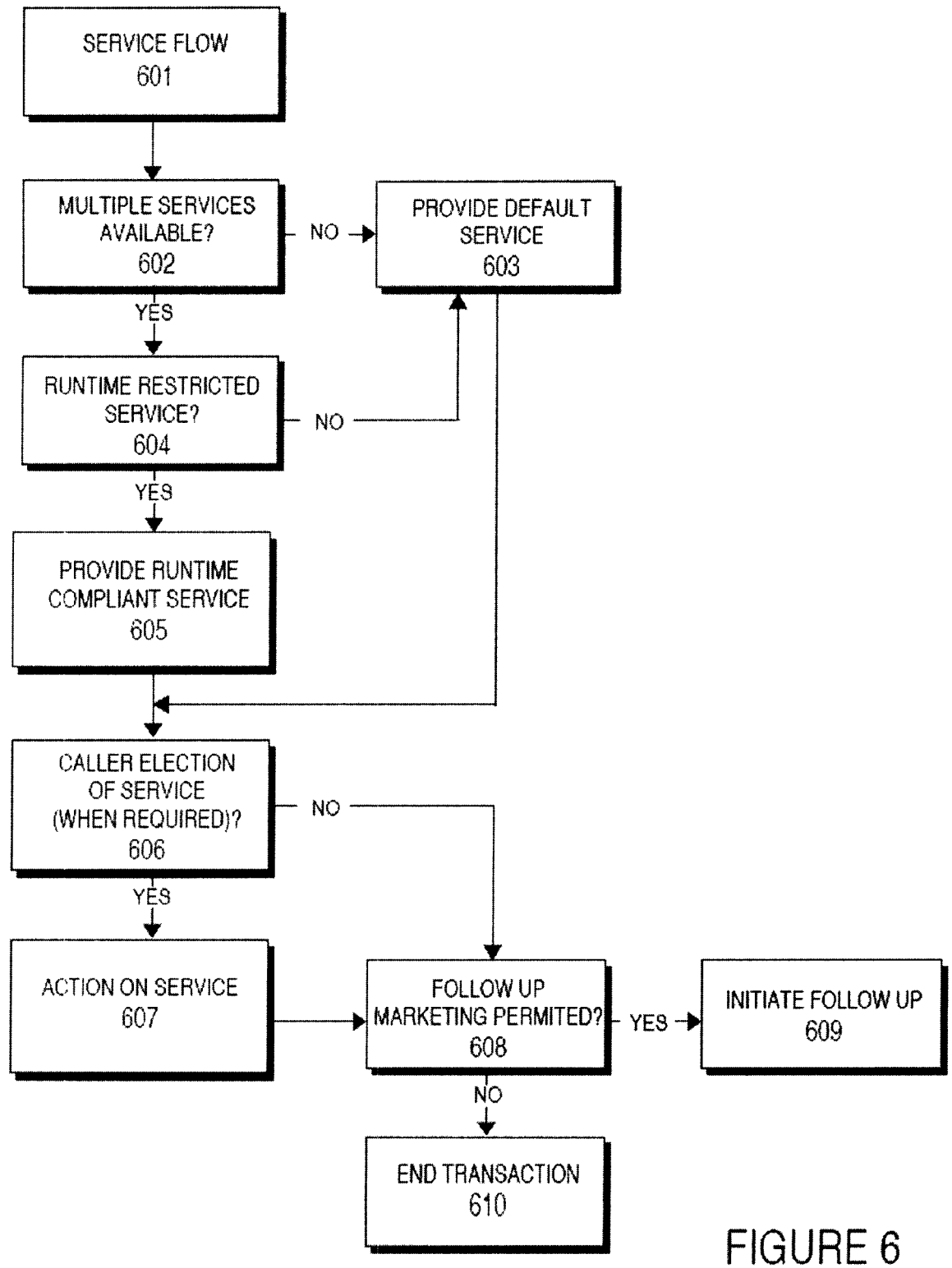
FIG. 6 is a flow diagram illustrating the service flow of one embodiment of the invention.

FIG. 6 is a flow diagram illustrating the service flow of one embodiment of the invention, and such as may be initiated in step 509 of FIG. 5. At step 601 the service flow begins. At decision block 602 it is determined if there are multiple services available for this participant. If not, a default service is provided at step 603 and the system proceeds to step 606. If there are multiple services available, it is determined if they are runtime restricted at decision block 604. If not, the default service is provided at step 603. If the services are runtime restricted, then the appropriate runtime compliant service is provided at step 605.

At decision block 606 it is determined if the caller (when necessary) has accepted or elected the provided service. As noted previously, this step can result in a fee charge to the caller. If the caller elects the service, the system proceeds to execute the service at step 607.

After the service has been executed, or if the caller did not elect a service at step 606, it is determined if follow up marketing is permitted at decision block 608. This may hinge on the participant, do-not-call restrictions, etc. If follow up marketing is not permitted the transaction ends at step 610. If follow up marketing is permitted, it is initiated at step 609.

Predictive Routing

In one embodiment of the present invention, communication attempts are monitored and intercepted for analysis. The system detects faults in these attempts due to human error, computer error, and line/wireless interference. It then predicts and offers corrected connections, paths and solutions to complete the intended, desired or compatible transactions.

Communication intercept stations tap into and capture communication attempts, such as via satellite, microwave, cellular and fiber-optic communications traffic, and then process and analyze this information. This monitoring and intercept may also be on a selective basis by subscribers, network providers, equipment makers, or other elected participation. The analysis of the communication attempt may include voice recognition and optical character recognition programs. The system looks for dialing patterns, data patterns, graphic patterns and keyed or spoken words and phrases that will prompt the system to flag the message for immediate special services. These special services may include (i) corrective routing by analyzing and predicting what the person/computer is trying to accomplish vs. what is being achieved or the system predicts will be achieved (ii) recording and transcribing for future analysis. Intelligence systems at each of the respective intercept stations maintain keyword lists to analyze anything flagged by the system, which is then processed for lookup and matching against historical and exact/fuzzy information to arrive at predictive solutions and suggestions for the sender or special service system/operator.

Figure 8:
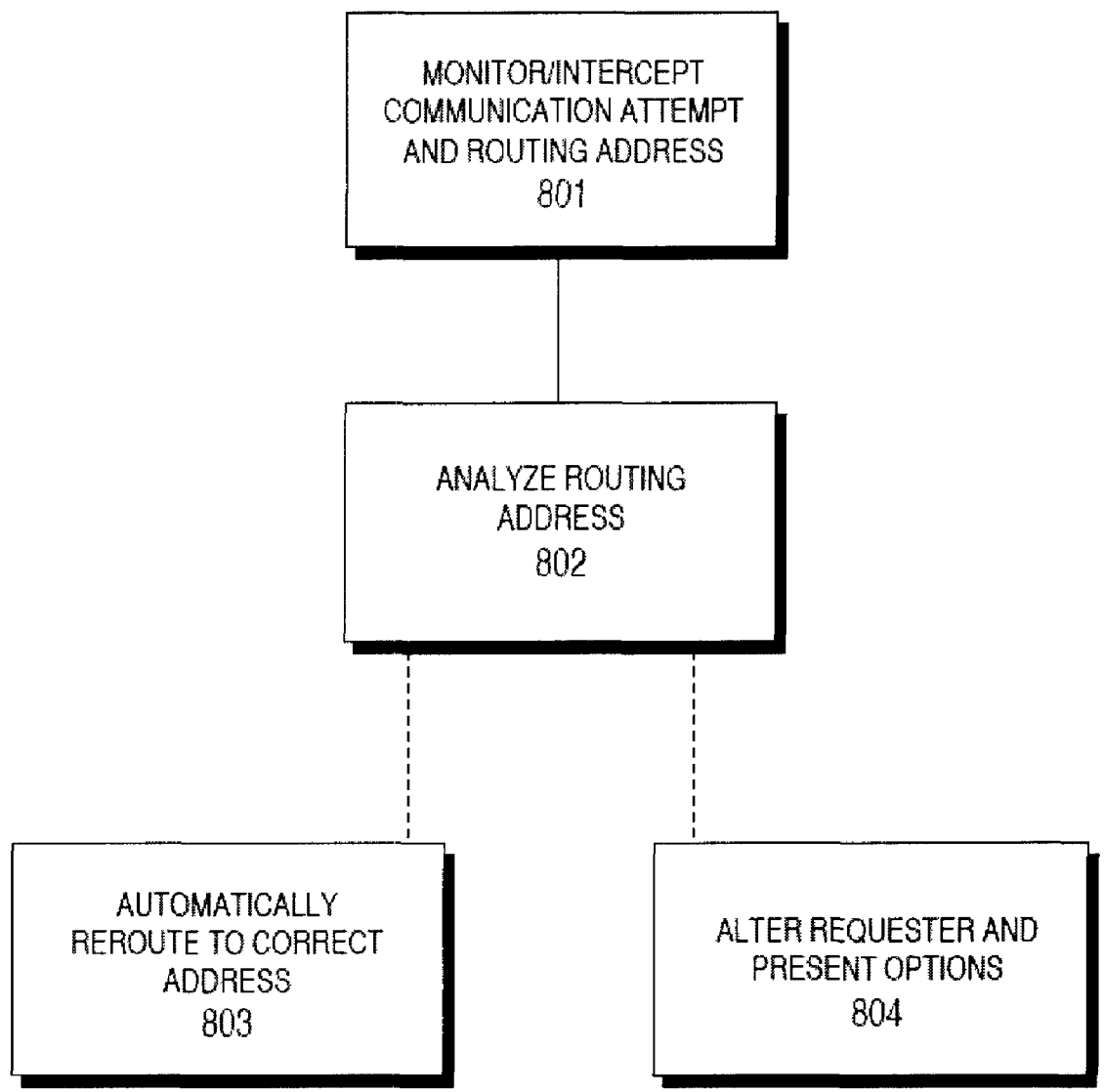
FIG. 8 is a flow diagram of an alternate embodiment of the invention.

FIG. 8 is a flow diagram illustrating an embodiment of the invention. At step 801 a communication attempt is monitored and detected. The routing address (phone number, URL, email address, fax number, telex number, etc.) is analyzed at step 802. The analysis may be tailored to each individual requester and may include comparison to previous communication attempts and matching of the routing address to previously contacted routing addresses. For example, if a transposition of elements (a wrong number, typo, mis-spelled address, etc.) has occurred, the system may be able to catch it and take a number of corrective steps. For example, at step 803 the system may simply reroute the attempt to a predicted "correct" routing address. This could function in much the same way as automatic spell checkers in word processing programs work in the sense that information that does not appear in the library is corrected automatically to the closest likely word that is resident in the dictionary. Similarly, the present invention could select a correct routing address that has the highest similarity to the attempted routing address. There are a number of well know algorithms for accomplishing such matching and any may be used herein. In other embodiments, the system could include voice recognition software to analyze communication attempts made via voice.

Alternatively, at step 804 the system could alert the requester to the potential error in the routing address and provide an option for the requester to continue with the original request or to accept the offered corrected address, or even permit the requester to select from a list of possible correct addresses.

For inactive routing addresses, this embodiment could function much as described above for providing options and services to the requester. In addition, follow up marketing calls could be initiated even when no miscommunication is directed, based on any attempt at communication by the requester.

Embodiment of Computer Execution Environment (Hardware)

Figure 7:
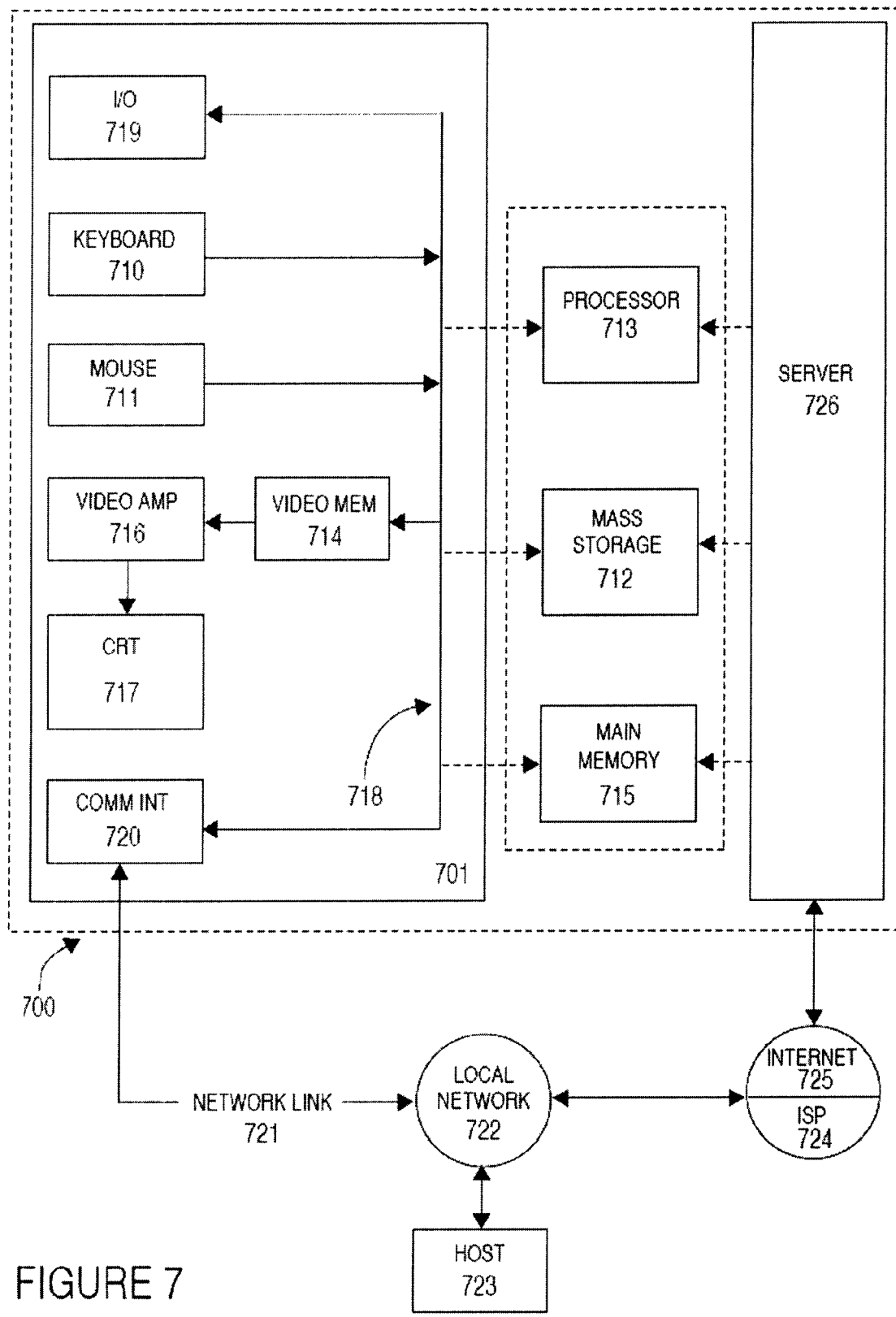
FIG. 7 is a diagram of a computer embodiment of the invention.

An embodiment of the invention can be implemented as computer software in the form of computer readable program code executed in a general purpose computing environment such as environment 700 illustrated in FIG. 7, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 710 and mouse 711 are coupled to a system bus 718. The keyboard and mouse are for introducing user input to the computer system and communicating that user input to central processing unit (CPU) 713. Other suitable input devices may be used in addition to, or in place of, the mouse 711 and keyboard 710. I/O (input/output) unit 719 coupled to bi-directional system bus 718 represents such I/O elements as a printer, A/V (audio/video) I/O, etc.

Computer 701 may include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Wireless links are also possible. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to host 723 or to data equipment operated by ISP 724. ISP 724 in turn provides data communication services through the world wide packet data communication network now commonly referred to as the "Internet" 725. Local network 722 and Internet 725 may use electrical, electromagnetic or optical signals which carry digital data streams. The signals through the various networks and the signals on network link 721 and through communication interface 720, which carry the digital data to and from computer 700, are exemplary forms of carrier waves transporting the information.

Processor 713 may reside wholly on client computer 701 or wholly on server 726 or processor 713 may have its computational power distributed between computer 701 and server 726. Server 726 symbolically is represented in FIG. 7 as one unit, but server 726 can also be distributed between multiple "tiers". In one embodiment, server 726 comprises a middle and back tier where application logic executes in the middle tier and persistent data is obtained in the back tier. In the case where processor 713 resides wholly on server 726, the results of the computations performed by processor 713 are transmitted to computer 701 via Internet 725, Internet Service Provider (ISP) 724, local network 722 and communication interface 720. In this way, computer 701 is able to display the results of the computation to a user in the form of output.

Computer 701 includes a video memory 714, main memory 715 and mass storage 712, all coupled to bi-directional system bus 718 along with keyboard 710, mouse 711 and processor 713. As with processor 713, in various computing environments, main memory 715 and mass storage 712, can reside wholly on server 726 or computer 701, or they may be distributed between the two. Examples of systems where processor 713, main memory 715, and mass storage 712 are distributed between computer 701 and server 726 include the thin-client computing architecture developed by Sun Microsystems, Inc., the palm pilot computing device and other personal digital assistants, Internet ready cellular phones and other Internet computing devices, and in platform independent computing environments, such as those that utilize the Java technologies also developed by Sun Microsystems, Inc.

The mass storage 712 may include both fixed and removable media, such as magnetic, optical or magnetic optical storage systems or any other available mass storage technology. Bus 718 may contain, for example, thirty-two address lines for addressing video memory 714 or main memory 715. The system bus 718 may also include, for example, a 32-bit data bus for transferring data between and among the components, such as processor 713, main memory 715, video memory 714 and mass storage 712. Alternatively, multiplex data/address lines may be used instead of separate data and address lines.

In one embodiment of the invention, the processor 713 is a microprocessor manufactured by Motorola, such as the 670X0 processor or a microprocessor manufactured by Intel, such as the 70X76, or Pentium processor, or a SPARC microprocessor from Sun Microsystems, Inc. However, any other suitable microprocessor or microcomputer may be utilized.

Main memory 715 may be comprised of dynamic random access memory (DRAM). Video memory 714 may be a dual-ported video random access memory. One port of the video memory 714 may be coupled to video amplifier 716. The video amplifier 716 may be used to drive a display/output device 717, such as a cathode ray tube (CRT) raster monitor. Video amplifier 716 is well known in the art and may be implemented by any suitable apparatus. This circuitry converts pixel data stored in video memory 714 to a raster signal suitable for use by display/output device 717. Display/output device 717 may be any type of monitor suitable for displaying graphic images.

Computer 701 can send messages and receive data, including program code, through the network(s), network link 721, and communication interface 720. In the Internet example, remote server computer 726 might transmit a requested code for an application program through Internet 725, ISP 724, local network 722 and communication interface 720. The received code may be executed by processor 713 as it is received, and/or stored in mass storage 712, or other non-volatile storage for later execution. In this manner, computer 700 may obtain application code in the form of a carrier wave. Alternatively, remote server computer 726 may execute applications using processor 713, and utilize mass storage 712, and/or video memory 715. The results of the execution at server 726 are then transmitted through Internet 725, ISP 724, local network 722 and communication interface 720. In this example, computer 701 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for example only. An embodiment of the invention may be implemented in any type of computer system or programming or processing environment.

Thus, a method and apparatus for processing routing requests are described in conjunction with one or more specific embodiments. The invention is defined by the following claims and their full scope and equivalents.

I claim:

1. A method of communication to a routing address comprising: using a processing system, receiving a communication request from a requester for routing to a first address where the requester intends the communication with a first party at the first address;
using a database, determining characteristics associated with the first address,
using the processing system, contacting the requester after a predetermined time when the first address is not associated with the first party.

2. The method of claim 1 wherein determining characteristics of the first address is accomplished by comparing the first address to a database.

3. The method of claim 1 wherein one or more service options are selected from a plurality of service options and are selected based on the characteristics of the address and provided to the requester.

4. The method of claim 3 wherein the characteristics comprise geographic information of routing address, time of day, day of week, geographic information of requester, commercial information associated with the routing address, and characteristics of the plurality of service options.

5. The method of claim 1 wherein the routing address comprises a phone number.

6. The method of claim 1 wherein the routing address comprises a computer network address.

7. The method of claim 1 wherein the routing address comprises an email address.

8. The method of claim 1 wherein the routing address comprises a telex address.

9. The method of claim 1 further including a service option comprises routing said request to a new routing address location of a prior assignee of the routing address.

10. The method of claim 1 further including a service option comprises providing advertising to the requester.

11. The method of claim 1 further including a service option comprises providing routing address information to a location providing a similar service as a prior assignee of the routing address.

12. A communication method comprising:
using a processing system, monitoring a communication request from a requester to a routing address where the requester intends the request to go to a first party at the routing address;
using a database, analyzing the routing address and determining characteristics associated with the routing address, and
using the processing system, contacting the requester after a predetermined time when the first address is not associated with the first party.

13. The method of claim 12 wherein determining characteristics of the first address is accomplished by comparing the first address to a database.

14. The method of claim 12 wherein one or more service options are selected from a plurality of service options and are selected based on the characteristics of the address and provided to the requester.

15. The method of claim 14 wherein the characteristics comprise geographic information of routing address, time of day, day of week, geographic information of requester, commercial information associated with the routing address, and characteristics of the plurality of service options.

16. The method of claim 12 wherein the routing address comprises a phone number.

17. The method of claim 12 wherein the routing address comprises a computer network address.

18. The method of claim 12 wherein the routing address comprises an email address.

19. The method of claim 12 wherein the routing address comprises a telex address.

20. The method of claim 12 further including a service option comprises routing said request to a new routing address location of a prior assignee of the routing address.

21. The method of claim 12 further including a service option comprises providing advertising to the requester.

22. The method of claim 12 further including a service option comprises providing routing address information to a location providing a similar service as a prior assignee of the routing address.

* * * * *